United States Patent [19]

Ryntz et al.

[11] Patent Number: 4,855,359

[45] Date of Patent: Aug. 8, 1989

[54] THERMOSETTING CAPROLACTONE-STYRENE ALLYL ALCOHOL POLYESTER URETHANE COATING COMPOSITION

[75] Inventors: Rose A. Ryntz, Mt. Clemens; Karen A. Surcina, Bloomfield Hills; Kenneth R. Kurple, Anchorville, all of Mich.

[73] Assignee: E. I. Du Pont de Nemours and Company, Wilmington, Del.

[21] Appl. No.: 145,921

[22] Filed: Jan. 20, 1988

[51] Int. Cl.$^4$ .................. C08L 75/04; C08F 8/30
[52] U.S. Cl. .................. 525/130; 525/127; 525/219
[58] Field of Search .................. 525/130, 219, 127

[56] References Cited

U.S. PATENT DOCUMENTS

| | | | |
|---|---|---|---|
| 3,775,327 | 11/1973 | Thompson | 252/62.54 |
| 3,855,357 | 12/1974 | Harris et al. | 260/897 C |
| 4,070,509 | 1/1978 | Garner et al. | 427/385.5 |
| 4,203,875 | 5/1980 | Garner et al. | 260/13 |
| 4,332,711 | 6/1982 | Kooymans et al. | 523/402 |
| 4,435,542 | 3/1984 | Watanabe et al. | 525/118 |
| 4,698,398 | 10/1987 | Kordomenos et al. | 525/437 |
| 4,698,400 | 10/1987 | Kordomenos et al. | 525/450 |
| 4,698,402 | 10/1987 | Kordomenos et al. | 525/533 |
| 4,699,957 | 10/1987 | Kordomenos et al. | 525/450 |
| 4,699,958 | 10/1987 | Kordomenos et al. | 525/528 |
| 4,699,959 | 10/1987 | Kordomenos et al. | 525/528 |
| 4,701,501 | 10/1987 | Kordomenos et al. | 525/449 |
| 4,708,995 | 11/1987 | Kordomenos et al. | 525/450 |

OTHER PUBLICATIONS

Research Disclosure—Urethane Coatings of Improved Resistance to Weathering Based on Styrene Allyl Alcohol Copolymers Publication No. 1506 Styrene—Allyl Alcohol in Industrial Coatings RJ—100 and RJ—101 Resinous Polyols, 08/1978.

*Primary Examiner*—John C. Bleutge
*Assistant Examiner*—Susan Berman
*Attorney, Agent, or Firm*—John M. Lynn

[57] ABSTRACT

A thermosetting coating composition useful as a primer for metal automobile and truck bodies having excellent chip resistance which contains a binder, a liquid carrier for the binder and pigments; wherein the binder contains (1) a hydroxyl terminated copolymer of styrene/allyl alcohol polymer chain extended with caprolactone;
(2) a hydroxy functional polyester urethane and
(3) an alkylated melamine resin or blocked poly-isocyanate crosslinking agent.

9 Claims, No Drawings

THERMOSETTING CAPROLACTONE-STYRENE ALLYL ALCOHOL POLYESTER URETHANE COATING COMPOSITION

BACKGROUND OF THE INVENTION

This invention relates to a coating composition and in particular to a primer composition for automobile and truck bodies that has excellent chip resistance.

Automotive and truck manufacturers have done a substantial amount of research on improving the corrosion and chip resistance properties of the painted exterior sheet metal parts of automobiles and trucks. Typical chip resistant primer compositions are shown in Kordomenos et al U.S. Pat. No. 4,708,995 issued Nov. 24, 1987, Kordomenos et al U.S. Pat. Nos. 4,698,399, 4,698,398, 4,698,402 and 4,698,400 each issued Oct. 6, 1987; Kordomenos et al U.S. Pat. Nos. 4,699,957, 4,699,958 and 4,699,959 each issued Oct. 13, 1987 and Kordomenos et al U.S. Pat. No. 4,701,501 issued Oct. 20, 1987. Additional requirements have been placed on primer compositions. The compositions are to cure at lower bake temperatures than typical prior art compositions to save on energy costs and are to achieve superior chip resistance with lower film thickness in comparison to prior art compositions.

SUMMARY OF THE INVENTION

A thermosetting coating composition contains a binder and a liquid carrier for the binder; wherein the binder contains the following:
(1) a hydroxyl terminated copolymer of styrene/allyl alcohol polymer chain extended with caprolactone diol;
(2) a polyester urethane and
(3) an alkylated melamine resin or blocked isocyanate crosslinking agent.

DETAILED DESCRIPTION OF THE INVENTION

The novel primer composition of this invention preferably has a solids content of about 40-80% by weight and utilizes a solvent for the binder as the liquid carrier. Generally, high solids compositions are used that have a solids content of about 50-60% by weight and are useful as primers on bare metal such as cold roll steel or on phosphatized steel substrates. A high solids coating is one that has a volatile organic content of about 479 g/l or 4.0 lb./gal. or less. These compositions can be applied by conventional spray techniques.

Also preferred, are high solids coating compositions that have a solids level in the range of 65-80% by weight. These compositions are applied to those areas of the automobile or truck, such as rocker panels, that are exposed to high levels of chipping. The compositions can be applied in thicknesses ranging from 1-20 mils wet to obtain final coatings in the range of 1-10 mils dry. The coating may be feathered down to blend in with paint applied to regions outside that require additional chip resistance protection. The compositions at a high level of solids may be applied by using hot spray equipment using temperatures of 20°-65° C. for spraying.

The binder of the primer composition contains about 5-25% by weight of the hydroxyl terminated copolymer of strene/allyl alcohol polymer chain extended with caprolactone, 40-75% by weight of hydroxy functional polyester urethane and 20-40% by weight of the alkylated melamine or blocked polyisocyanate cross linking agent. In addition, the composition contains solvent for the binder, pigments and additives such as flow control agents, catalyst and the like.

The components used in the primer composition are described in further detail below.

Styrene/Allyl Alcohol Polymer Chain Extended with Caprolactone

The styrene/allyl alcohol polymer chain extended with caprolactone is hydroxy terminated and is prepared by reacting a styrene/allyl alcohol polymer with caprolactone in a molar ratio of about 0.5:1 to 6:1 with a catalyst at a temperature of about 100°-200° C. for about 1-6 hours. The resulting polymer has a number average molecular weight of about 750-4000 and a weight average molecular weight of about 1,000-10,000 measured by gel permeation chromatography using polystyrene as the standard.

The styrene/allyl alcohol polymer used herein has a number average molecular weight of about 500-3,000 and a weight average molecular weight of about 750-5,000. Preferred polymers are commercially available from Monsanto Chemical Company under the Trademarks "RJ-100" and "RJ-101" and have a number average molecular weight of about 1,000-2,000 and a weight average molecular weight of about 1,500-3,000.

Typical catalysts used to prepare the copolymer are for example alkyl metallic oxides such as dibutyl tin oxide, hydrated monobutyltin oxide, butyl chlorotin dihydroxide, butyl tin tris(2-ethylhexoate), tetraisopropyl titanate, Other catalysts known to those skilled in the art can also be used.

Conventional organic solvents compatible with the constituents used to prepare the copolymer and the resulting copolymer that are used are as follows: aromatic, aliphatic or cycloaliphatic hydrocarbon solvents such as toluene, xylene, "Solvesso 100", ketones, alcohols, esters, ethers and mixtures thereof. These conventional solvents are also used to prepare the hydroxy functional hydroxy polyester urethane and the primer composition.

When reduced flexibility can be tolerated for the cured primer composition, the styrene/allyl alcohol polymer can be used directly without chain extension.

Hydroxy Functional Polyester Urethane

In the preparation of the polyester urethane, a hydroxy functional polyester is first formed and then reacted with a polyisocyante to form the hydroxy functional polyester urethane The polyester is the reaction product of a polyhydroxy material of diols and triols and an acid component of aliphatic, cycloaliphatic or aromatic acid or anhydrides thereof. The polyhydroxy materials are reacted with the acid component to provide hydroxyl groups and carboxyl groups in a ratio of about 1.1:1 to about 1.7:1. Generally, the polyester has a number average molecular weight of about 500-3,000 and a weight average molecular weight of about 750-5,000. The polyester urethane has a number average molecular weight of about 1,000-5,000 and a weight average molecular weight of about 1,000-15,000.

The diols used to form the polyester include, but are not limited to, alkylene glycols, such as butylene glycol, neopentyl glycol, 1,5-pentene glycol, 3-cyclohexene-1.1-dimethynol, other glycols such as hydrogenated bisphenol A, caprolactone diol (e.g., the reaction product of caprolactone and ethylene glycol), hydroxy alkylated bisphenols, polyether glycols, e.g., 2,2-dimethyl-3-hydroxy-propyl-2,2-dimethyl-3-hydroxypropionate, and the like. Preferred diols are neopentyl glycol and 2,2-dimethyl-3-hydroxypropyl-2-dimethyl-3-hydroxypropionate, the latter material being commercially available as Esterdiol 204 (trademark, Union Carbide Corp., Danbury, Conn.) and mixtures thereof.

The triols used to form the polyester include, but are not limited to conventional low molecular triols such as 1,2,6-hexane triol, 1,1,1-trimethylol propane, 3-(2-hydroxy-propoxy)-1,2-propanediol and polycaprolactone triols, which are commercially available as, for example, TONE-301 (trademark, Union Carbide Corp., Danbury, Conn.).

The polyol component of the polyester preferably comprises from about 10 to about 80 weight percent triols and from about 90 to about 20 weight percent diols.

The polyol component may also comprise, in addition to the triols and diols other polyol material such as tetrols.

The acid component used to form the polyester is from the group comprising aliphatic, aromatic, or cycloaliphatic dicarboxylic acids and anhydrides thereof. Numerous examples of such dicarboxylic acids and anhydrides are well known to those in the art. Preferably the acid component is selected from the group comprising $C_4$-$C_{12}$ dicarboxylic acids and anhydrides thereof, which group includes, but is not limited to, adipic acid, azelaic acid, sebasic acid, dodecane dicarboxylic acid, cyclohexane dicarboxylic acid and anhydrides thereof. Typical aromatic dicarboxylic acid such as phthalic acid, and its anhydride, isophthalic acid and terephthalic acid also can be used. Mixtures of suitable acids and/or their anhydrides may also be used as the acid component.

A catalyst is generally used to form the polyester. Any of the aformentioned catalysts used to form the styrene/allyl alcohol caprolactone chain extended polymer can be used and other catalysts such as strong acids as p-toluene sulfonic acid, phosphoric acid, sulfuric acid, and materials such as zinc oxide, antimony oxide ($Sb_2O_3$) and sodium acetate.

The hydroxy functional polyester is reacted with a suitable organic polyisocyanate at a temperature of about 90° to 110° C. for about 1 to 4 hours. The molar ratio of polyester to isocyanate is about 0.3:1 to about 1.7:1 to form a hydroxy functional polyester urethane.

Typical polyisocyanates that can be used are aliphatic compounds such as trimethylene, tetramethylene, pentamethylene, hexamethylene, 1,2-propylene, 1,2-butylene, 2,3-butylene, 1,3-butylene, ethylidine and butylidene diisocyanates; the cycloalkylene compounds such as 1,3-cyclopentane, 1,4-cyclohexane, and 1,2-cyclohexane diisocyanates; alkylene bis/cyclohexyl isocyanates) such as methylene bis(4-cyclohexyl isocyanate); the aromatic compounds such as m-phenylene, p-phenylene, 4,4'-diphenyl, 1,5-naphthalene, and 1,4-naphthalene diisocyanates, the aliphatic-aromatic compounds such as 4,4'-diphenylene methane, 2,4- or 2,6-tolylene or mixtures thereof, 4,4'-toluidine, and 1,4-xylylene diisocyanates; substituted aromatic compounds such as dianisidine diisocyanate, 4,4'-diphenylether diisocyanate and chlorodiphenylene diisocyanate; the triisocyanates such as triphenyl methane-4,4,4''-triisocyanate, 1,3,5-triisocyanate benzene and 2,4,6-triisocyanate toluene; the tetraisocyanates such as 4,4'-diphenyl-dimethyl methane-2,2',5,5'-tetraisocyanate; and the polymerized polyisocyanates such as tolylene diisocyanate dimers and trimers, and the like.

One preferred polyisocyanate is methylene bis (4-cyclohexylisocyanate).

Crosslinking Agents

Alkylated melmine cross linking agents or blocked polyisocyanate crosslinking agents can be used in the primer composition of this invention. Typical alkylated melamine crosslinking agents are alkylated melamine formaldehyde resins that generally have 1-4 carbon atoms in the alkyl group. These resins are prepared by conventional techniques in which an alcohol such as methanol, ethanol, proponal, isopropanol, butanol, isobutanol, tertiary butanol and the like are reacted with a melamine formaldehyde resin. The resulting agent can be monomeric or polymeric or mixtures thereof. One preferred agent is "Cymel" 1161 which is a monomeric methylated/isobutylated melamine (75/25 methyl-/isobutyl).

The blocked polyisocyanate that is used in the primer composition is an isocyanate compound containing two or more isocyanate groups, all of which have been reacted with a material which will prevent reaction of the isocyanate group at room temperature with compounds that conventionally react with such groups, and at least some of which will permit that reaction to occur at higher (cure) temperatures. In general the blocked polyisocyanate may be prepared by reacting a sufficient quantity of an active hydrogen containing blocking agent with the polyisocyanate to insure that no free isocyanate groups are present. The blocking agent may be selected from numerous materials, hereinafter discussed, which bear an active hydrogen.

The blocked polyisocyanate crosslinking agent is included in compositions of the invention in amounts such that upon deblocking of the blocked isocyanate groups at the cure temperature of the composition, the crosslinking agent provides between about 0.5 and about 1.6, preferably between about 0.8 and about 1.3, reactive isocyanate groups per hydroxy group on the film forming hydroxy functional urethane polyester resin and the hydroxy terminated caprolactone extended styrene/allyl alcohol copolymer of the coating composition as described above. Blocked polyisocyanates of numerous types may be employed in the compositions of the invention. Particularly suitable blocked polyisocyanates, which will be discussed further hereinafter, are those selected from the group consisting of blocked polymethylene polyphenol isocyanates, isocyanurate ring containing blocked polyisocyanates and certain oligoester modified blocked polyisocyanates.

In the preparation of the blocked polyisocyanate crosslinking agent, any suitable organic polyisocyanate may be used. Any of the aformentioned polyisocyanates can be used to form the polyester urethane.

In addition, the organic polyisocyanate may be a prepolymer derived from a polyol including polyether polyol or polyester polyol, including polyethers which are reacted with excess polyisocyanates to form isocyanate-terminated prepolymers. The polyols may be simple polyols such as glycols, e.g., ethylene glycol and propylene glycol, as well as other polyols such as glycerol; trimethylolpropane, pentaerythritol, and the like, as well as mono-ethers such as diethylene glycol, tripropylene glycol and the like and polyethers, i.e., alkylene oxide condensates of the above. Among the alkylene oxides that may be condensed with these polyols to form polyethers are ethylene oxide, propylene oxide, butylene oxide, stryene oxide and the like. These are generally called hydroxyl-terminated polyethers and can be linear or branched. Examples of polyethers include polyoxyethylene glycol, polyoxypropylene glycol. Polyoxytetramethylene glycol, polyoxyhexamethylene glycol, polyoxynonomethylene glycol, polyoxydecamethylene glycol, polyoxydodecamethylene glycol and mixtures thereof. Other types of polyoxyalkylene glycol ethers can be used. Especially useful polyether polyols are those derived from reaction polyols such as ethylene glycol, diethylene glycol, triethylene glycol, 1,4-butylene glycol, 1,3-butylene glycol, 1,6-hexanediol, and their mixtures; glycerol, trimethylolethane, trimethylolpropane, 1,2,6-hexanetriol, pentaerythritol, dipentaerythritol, tripentaerythritol polypentaerythritol, sorbitol, methyl glucosides, sucrose and the like with alkylene oxides such as ethylene oxide, propylene oxide, their mixtures, and the like.

A particular class of aromatic polyisocyanates which may be employed in the primer compositions are polymethylene polyphenol isocyanates having the general formula:

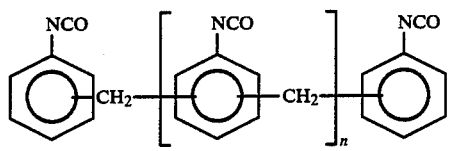

wherein n equals 1 to 3. Such compounds, sold under the tradename "PAPI" by the UpJohn Chemical Company of Kalamazoo, Mich., have proven to be particularly useful in compositions of the invention, resulting in compositions of the invention, resulting in compositions exhibiting desirable toughness in the final cured coating.

The active hydrogen containing blocking agents which are reacted with the above described organic diisocyanates may be selected from numerous blocking agents which will be apparent to those skilled in this art. Representative of those blocking agents which are preferred are those selected from the group consisting of (i) aliphatic, cycoaliphatic and aromatic alkyl monoalcohols; (ii) hydroxyl amines; (iii) oximes; (iv) lactams; and (v) triazoles. Any suitable aliphatic, cycloaliphatic or aromatic alkyl monoalcohol may be used as a blocking agent in accordance with the present invention. For example, aliphatic alcohols, such as methyl, ethyl, chloroethyl, propyl, butyl, amyl, hexyl, heptyl, octyl, nonyl, 3,3,5-trimethylhexyl, decyl, and lauryl alcohols, and the like may be employed. Suitable cycloaliphatic alcohols include, for example, cyclopentanol, cyclohexanol and the like, while aromatic-alkyl alcohols include phenylcarbinol, methylphenylcarbinol, and the like. Minor amounts of even higher molecular weight relatively non-volatile monoalcohols may be used, if desired, to serve as plasticizers in the coatings provided by the invention. Examples of hydroxyl amines which may be employed as blocking agents include ethanol amine and propanol amine. Suitable oxime blocking agents include, for example, methylethylketone oxime, acetone oxime and cyclohexanone oxime. Examples of lactams which may be used as blocking agents are epsilon-caprolactam, epsilon-butyrolactam and pyrrolidone, while suitable triazoles include compounds such as 1,2,4-triazole, 1,2,3-benzotriazole, 1,2,3-tolyl triazole and 4,5-diphenyl-1,2,3-triazole. Particularly preferred active hydrogen containing blocking agents are methylethyl ketoxime and 2-ethylhexanol.

Within the scope of the above general class of blocked polyisocyanate crosslinking agents, a particular class type of blocked polyisocyanate crosslinking agent which may be employed in the primer compositions comprises isocyanurate ring containing blocked isocyanate compounds. In general, these blocked polyisocyanates may be formed by blocking with the aforementioned blocking agent isocyanate ring containing polyisocyanates. These compounds may be formed by cyclotrimerization of difunctional isocyanates. Usually, the reaction does not stop in this stage and continues through the formation of polyfunctional oligomers or a mixture of such oligomers with a portion of the pure trifunctional polyisocyanate. Mixtures of trifunctional product and various polyfunctional oligomers are commercially available.

A particularly desirable blocked polyisocyanate crosslinking agent is the blocked form of the pure trifunctional isocyanurate represented by the following formula:

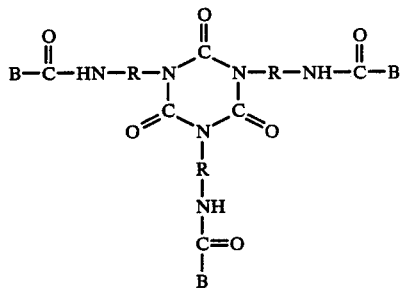

wherein R is selected from the group consisting of aliphatic, cycloaliphatic and aromatic groups and combinations thereof and B is the residue of an active hydrogen containing blocking agent. More specifically, this compound is disclosed in U.S. Pat. No. 4,491,663, the disclosure of which is hereby incorporated by reference.

Still further particular blocked polyisocyanates useful as crosslinking agents in the primer compositions are oligoester modified blocked polyisocyanates prepared from a particular class of oligoester diols and triols. A first type of such oligoester modified blocked polyisocyanates is prepared from organic diisocyanates bearing one isocyanate group more reactive than the other, with the more reactive isocyanate first being blocked with a blocking agent and the remaining isocyanate group then being reacted with hydroxyl functionality of an oligoester diol or triol as referred to above. The second type of oligoester modified blocked polyisocyanate may be prepared by reacting oligoester diols from the aforementioned class of oligoesters with an excess of organic diisocyanate so as to form an isocyanate terminated prepolymer followed by blocking of the terminal isocyanate groups of the prepolymer with an active hydrogen containing blocking agent. Each of these materials is particularly useful in the compositions of the invention and produces final cured coating compositions exhibiting outstanding flexibility.

Other Components Used in the Primer Composition

The primer compositions have been found to provide a cured coating having the advantageous physical properties described above, over a wide range of solids levels. More specifically, the coating compositions according to preferred embodiments of the invention have been found to cure at temperatures from as low as about 120° C. or less within about 15 minutes or less, and yet to cure and suffer no significant loss of advantageous physical properties at temperatures as high as about 200° C. or more for periods up to about 60 minutes or more. Considered together with the storage stability of the coating composition, it can be readily recognized that the present invention provides a highly significant advance in the coating composition art.

It will be within the skill of the art to determine the proper Volatile Organic Content (VOC) for a given primer composition and for a given application. Preferred solvents have relatively low volatility at temperatures appreciably below their boiling points such that solvent evaporation is low during storage and/or application of the coating composition to the substrate. A suitable solvent system may include, for example, toluene, methyl ethyl ketone, isobutyl acetate, xylene, cellosolve acetate, acetone and a mixture of any of them. Other solvents which may be employed include terpenes, aliphatic and aromatic naphthas, and the like. Additional suitable solvents are commercially available and will be apparent to the skilled of the art in view of the present disclosure. Any solvent allowed to remain in the cured coating should be inert so as to avoid adverse effect upon the cured coating or upon another coating layer used in conjunction with it during the curing process or thereafter. Preferably, the cured coating is substantially free of solvent.

Sufficient solvent is used to reduce the viscosity of the coating composition to a level suitable for application to the substrate in the desired manner.

Obviously, in those cases where the composition is to be applied as a chip resistant primer the amount of solvent will be reduced so as to give a solids level of about 65-80%. Such higher solids materials are generally applied using hot spray equipment.

Flow control agent(s), for example, polybutyl acrylate; wetting agent(s), for example, silicone; pigments; pigment dispersants; corrosion inhibitors, for example, chromate pigments, numerous of all of which are known to the skilled of the art, may be employed in the primer compositions of the invention. In addition, suitable reactive additives can be used, including, for example, low molecular weight diol flow control agents and reactive diluents.

Compositions of the invention, and in particular the chip resistant primers of the invention, may also include anti-settling or anti-sagging agents to control the thixotropic properties of the composition. Exemplary of available materials suitable for this purpose are Dislon (trademark) 6900-20X manufactured by Kusumoto Chemicals, Ltd., Tokyo, Japan and sold by King Industries, Norwalk, Conn. 06852; Bentone (trademark) 38, N. L. Industries, Highstown, N. J. 08520; and Cab-O-Sil (trademark) M-5, Cabot Corporation, Boston, Mass.

Curing the coating composition requires baking for sufficient time at sufficiently elevated temperature to react the crosslinking agent with the hydroxyl functionality of the hydroxy functional polyester urethane and the hydroxy terminated chain extended styrene/allyl alcohol copolymer. The time and temperature required to cure the coating are interrelated and depend upon the particular hydroxy functional polyester urethane and chain extended styrene/allyl alcohol copolymer crosslinking agent, solvent and other materials, if any, and the amount of each comprising the coating composition. The coating compositions according to preferred embodiments of the invention, as described above, have been found to provide the best coating results when cured at temperature at about 121° C. for 30 minutes. It is a highly significant advantage of the invention, however, that these same coating compositions can withstand, for example, temperature as high as about 200° C. (390° F.) for periods of time as long as about 60 minutes. Accordingly, great flexibility is provided in both designing and implementing a curing schedule for parts coated with the coating compositions of the invention. Thus, in the assembly of automotive vehicles, for example, vehicles unavoidably held in a curing oven for long periods of time during unplanned assembly line shutdowns are recovered with cured and unharmed coatings.

The primer compositions form coatings with improved corrosion resistance and chip resistance which represent an advance in the art.

The primer composition can be used as a high solids hot sprayable chip resistant primer for use on a bare metal substrate such as for an automotive vehicle body which is subject to chipping. Primer compositions generally are pigmented, typically useful pigments include carbon black, iron oxide, lithopone, magnesium silicate, silica, barium sulfate, $TiO_2$, chrome yellow, calcium chromate, strontium chromate, zinc potassium chromate any of the like may be used. The primer can be pigmented according to known methods including, for example, by grinding pigments in a portion of the curable resin and adding to the primer composition.

The pigment-to-binder ratio of the primer composition may be from about 10:100 to about 300:100 by weight. It is preferred, however, to use a primer having a pigment-to-binder ratio of from about 100:100 to about 150:100 by weight.

No special expedients are necessary in formulating the primer compositions of this invention. For example, they may be prepared simply by incorporating the resinous components in a suitable solvent system. Thus, for example, by suitable mixing or agitation, each resinous component may be dissolved in a solvent and the resulting solutions combined to form finished primer compositions.

The solvent system may be any suitable combination of organic solvents as described above. For a high solids, hot sprayable, automotive vehicle chip resistant primer, the solvent will comprise preferably about 20 to about 40 percent by weight of the total coating compositions, although of course, larger of smaller amounts may be utilized depending upon the solids content desired.

The primer is generally maintained at about 65 to about 80 percent solids content for hot spraying purposes with conventional thinners such as aromatic hydrocarbons, commercial petroleum cuts which are essentially aromatic, and the like, and sprayed onto the metal base or other substrate and cured. The primer may be applied in greater thickness of 1 to 25 mils wet, preferably 10 to 25 mils wet, in order to obtain final coatings in the desired range of 5-11 mils dry in regions highly susceptible to chipping and is then feathered down in thickness to the thickness of paints in areas not receiving a chip resistant primer. The primer is cured at elevated temperatures by an convenient means such as baking ovens or banks of infra-red heat lamps. Curing temperatures are preferably from about 135° C. to about 165° C., although curing temperatures from about 100° C. to about 230° C. may be employed, if desired.

The following example illustrates the invention. All parts and percentages are on a weight basis. Molecular weights are determined by gel permeation chromatography use polystyrene as a standard.

EXAMPLE

The following caprolactone extended styrene-allyl alcohol copolymers were prepared:

Copolymer Solution A

About 300 parts of stryene-allyl alcohol copolymer (RJ-100 from Monsanto Chemical Company having a number average molecular weight (Mn) of about 1600 and a weight average molecular weight (Mw) of about 2340) and 150 parts of xylene were charged into a reactor equipped with an addition funnel, reflux condenser, thermometer, stirrer and a heat source and heated to about 110° C. until the copolymer dissolved. About 150 parts of caprolactone and 0.9 parts of dibutyltin oxide were then added and the mixture was heated to about 150° C. for about 4 hours and then cooled to room temperature. The resulting copolymer solution had a Gardner Holt viscosity of about $Z_4$ at 79% solids. The resulting caprolactone chain extended styrene-allyl alcohol copolymer had a number average molecular weight (Mn) of about 2055 and a weight average molecular weight (Mw) of about 3985.

Copolymer Solution B

About 300 parts of stryene-allyl alcohol copolymer (RJ-100) and 150 parts of xylene were charged into a reactor equipped as above and heated to about 94° C. until the copolymer dissolved. About 300 parts of caprolactone and 0.9 parts of dibutyltin oxide were then added and the mixture was heated to about 150° C. for about 4 hours and then cooled to room temperature and reduced with 28 parts of xylene. The resulting copolymer solution had a Gardner Holt viscosity of about X−Y at 80% solids. The resulting caprolactone chain extended styrene-allyl alcohol copolymer had a number average molecular weight (Mn) of about 2231 and a weight average molecular weight (Mw) of about 4281.

Copolymer Solution C

About 250 parts of stryene-allyl alcohol copolymer (RJ-100) and 69 parts of xylene were charged into a reactor equipped as above and heated to about 94° C. until the copolymer dissolved. About 28 parts of caprolactone and 0.9 parts of dibutyltin oxide were then added and the mixture was heated to about 150° C. for about 4 hours and then cooled to room temperature and reduced with 74 parts of xylene. The resulting copolymer solution had a
Gardner Holt viscosity of about $Z_3-Z_4$ at 70% solids. The resulting caprolactone chain extended styrene-allyl alcohol copolymer had a number average molecular weight (Mn) of about 1538 and a weight average molecular weight (Mw) of about 2829.

Copolymer Solution D

About 240 parts of stryene-allyl alcohol copolymer (RJ-100) and 75 parts of xylene were charged into a reactor equipped as above and heated to about 94° C. until the copolymer dissolved. About 60 parts of caprolactone and 0.9 parts of dibutyltin oxide were then added and the mixture was heated to about 150° C. for about 4 hours and then cooled to room temperature and reduced with 70 parts of xylene. The resulting copolymer solution had a Gardner Holt viscosity of about $Z_1-Z_2$ at 70% solids. The resulting caprolactone chain extended styrene-allyl alcohol copolymer had a number average molecular weight (Mn) of about 1645 and a weight average molecular weight (Mw) of about 3403.

Copolymer Solution E

About 50 parts of stryene-allyl alcohol copolymer (RJ-100) and 50 parts of xylene were charged into a reactor equipped as above and heated to about 94° C. until the copolymer dissolved.

Copolymer Solution F

About 50 parts of stryene-allyl alcohol copolymer (RJ-101 from Monsanto Chemical Company having a number average molecular weight (Mn) of about 1150 and a weight average molecular weight (Mw) of about 1700) and 50 parts of xylene were charged into a reactor equipped as above and heated to about 94° C. until the copolymer dissolved.

Polyester Urethane Solution

A urethane extended polyester copolymer was prepared by charging the following constituents into a reactor equipped as above: 3324 parts of Esterdiol-204 (from Union Carbide), 1000 parts of trimethylolpropane, 2350 parts adipic acid, and 5 parts dibutyltin oxide. The resulting mixture was heated to 180°–205° C. and water was removed as formed in the reaction until an acid no. of 5 was reached. The resulting solution was cooled and 1200 parts xylene were added. The temperature of the solution was held at about 94° C. and 400 parts of "Desmodur" W, methylene bis (4-cyclohexylisocyanate), available from Mobay Corporation, was added dropwise over a period of 2 hours. The resulting mixture was postreacted at 94° C. until there was no free isocyanate present as determined by infrared spectrometry. The resulting copolymer was reduced with 340 parts of xylene and the resulting copolymer solution had a Gardner Holt viscosity of about $Z_1-Z_2$ at 80% solids and had an acid no. of 4. The resulting urethane extended polyester had a number average molecular weight (Mn) of about 1550 and a weight average molecular weight (Mw) of about 3500.

Millbase

A millbase was prepared by charging the following ingredients in the order shown with mixing into a ball mill and grinding the resulting composition until a level of 8 is attained on a Hegman grind gauge.

| Composition | Parts by Weight |
| --- | --- |
| Butyl acetate | 180 |
| "Nuosperse" 700 (dispersion aide available from Tenneco Chemical) | 20 |
| Polyester Urethane Solution (Prepared above) | 82 |
| Vulcan Black Pigment (carbon black pigment) | 6 |
| Red Iron Oxide Pigment | 31 |
| Strontium Chromate Pigment | 31 |
| Zopaque RCL-6 (Titanium dioxide pigment) | 100 |
| Barimite XF (Barytes pigment available from Pfizer Chemical Co.) | 500 |

Primer compositions 1-12 were prepared by thoroughly blending the constituents in the amounts shown in Table I and reduced to a spray viscosity with Solvesso 100 and sprayed onto phosphatized steel panels and baked at 121° C. for about 30 minutes and tested for humidity resistance in a Cleveland Humidity Cabinet, for chip resistance by a Gravelometer test and for adhesion to an electrodeposition primer. For the adhesion test, the primer coatings were sprayed onto steel panels that were coated with an alkyd epoxy electrodeposition primer. The results of these test are shown in Table II.

TABLE I

| Composition | PRIMER COMPOSITIONS | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Copolymer Soln. A | 284 | 567 | | | | | | | | | | |
| Copolymer Soln. B | | | 280 | 560 | | | | | | | | |
| Copolymer Soln. C | | | | | 321 | 640 | | | | | | |
| Copolymer Soln. D | | | | | | | 321 | 640 | | | | |
| Copolymer Soln. E | | | | | | | | | 559 | 896 | | |
| Copolymer Soln. F | | | | | | | | | | | 449 | 896 |
| Polyester Urethane Soln. | 2551 | 2268 | 2551 | 2268 | 2551 | 2268 | 2551 | 2268 | 2551 | 2268 | 2551 | 2268 |
| Cymel 1161* | 1181 | 1181 | 1181 | 1181 | 1181 | 1181 | 1181 | 1181 | 1181 | 1181 | 1181 | 1181 |
| Butyl Cellosolve Acetate | 195 | 195 | 195 | 195 | 195 | 195 | 195 | 195 | 195 | 195 | 195 | 195 |
| C-11 Ketone Solvent | 195 | 195 | 195 | 195 | 195 | 195 | 195 | 195 | 195 | 195 | 195 | 195 |
| Solvesso 100 Solvent | 390 | 390 | 390 | 390 | 390 | 390 | 390 | 390 | 390 | 390 | 390 | 390 |
| Millbase | 5495 | 5495 | 5495 | 5495 | 5495 | 5495 | 5495 | 5495 | 5495 | 5495 | 5495 | 5495 |
| Zeothix (Silicon Dioxide) | 402 | 402 | 402 | 402 | 402 | 402 | 402 | 402 | 402 | 402 | 402 | 402 |
| Butanol | 606 | 606 | 606 | 606 | 606 | 606 | 606 | 606 | 606 | 606 | 606 | 606 |
| DNNSA (Nacure 1051**Acid Catalyst) | 101 | 101 | 101 | 101 | 101 | 101 | 101 | 101 | 101 | 101 | 101 | 101 |

*Mixed ether melamine available from American Cyanamid Company
**Dinonyl naphthalene sulfonic acid catalyst available from King Industries, Inc.

TABLE II

| Primer Composition | CHC[1] | Gravelometer[2] | Adhesion[3] |
|---|---|---|---|
| 1 | 10 | 10 | 10 |
| 2 | 10 | 8 | 10 |
| 3 | 10 | 8 | 10 |
| 4 | 10 | 8 | 10 |
| 5 | 10 | 8 | 8 |
| 6 | 10 | 8 | 8 |
| 7 | 10 | 8 | 10 |
| 8 | 10 | 8 | 10 |
| 9 | 8 | 8 | 8 |
| 10 | 8 | 8 | 8 |
| 11 | 8 | 8 | 8 |
| 12 | 8 | 8 | 8 |

[1]Cleveland Humidity Cabinet
[2]ASTM Gravelometer, 10 pts. gravel
[3]Adhesion of primer to electrodeposition primer
Rating Scale
10 = best
1 = worst

We claim:

1. A thermosetting coating composition comprising a binder and a liquid carrier for the binder; wherein the binder consists essentially of
   (1) a hydroxyl terminated copolymer of styrene/allyl alcohol polymer chain extended with caprolactone where the styrene/allyl alcohol polymer and caprolactone are reacted in a molar ratio of about 0.5:1 to 6:1 and which polymer has a number average molecular weight of about 750-4000 and a weight average molecular weight of about 1,000-10,000; wherein the molecular weight is determined by gel permeation chromatography using polystyrene as the standard;
   (2) a hydroxy functional polyester urethane random polymer which has a number average molecular weight of about 1,000-5,000 and a weight average molecular weight of about 1,000-5,000; wherein the molecular weight is determined by gel permeation chromtography using polystyrene as the standard; and which is the reaction product of:
   (A) a hydroxy functional polyester which is the reaction product of:
      (i) a polyhydroxy material comprising diols and triols and
      (ii) acid component selected from aliphatic, cycloaliphatic or aromatic acids or anhydrides thereof; wherein (i) and (ii) are reacted to provide hydroxyl groups and carboxyl groups in a ratio of about 1.1:1 to 1.7:1; and
   (B) an organic polyisocyanate, wherein (A) and (B) are reacted in amounts so as to provide hydroxyl groups and isocyanate groups in a ratio of about 0.3:1 to 1.7; and
   (3) an alkylated melamine resin or blocked polyisocyanate crosslinking agent.

2. The coating composition of claim 1 in which the polyhydroxy material comprises linear aliphatic diols and triols.

3. The coating composition of claim 1 in which the acid component consists of $C_4$-$C_{12}$ dicarboxylic acids or anhydrides thereof.

4. The coating composition of claim 1 in which the polyisocyanate is an aliphatic isocyanate or a cycloaliphatic isocyanate.

5. The coating composition of claim 1 containing pigment in a pigment to binder weight ratio of about 10:100 to 300:100.

6. The coating composition of claim 1 in which the liquid carrier is a solvent for the binder and the composition has a binder content of about 40-80% by weight and a solvent content of about 20-60% by weight.

7. The coating composition of claim 6 in which the binder comprises
   (A) 5-25% by weight of the hydroxyl terminated copolymer of styrene/allyl alcohol polymer chain extended with caprolactone;
   (B) 40-75% by weight of hydroxy functional (C) 20–40% by weight of the alkylated melamine or blocked polyisocyanate crosslinking agent.

8. The coating composition of claim 1 in which the alkylated melamine resin comprises a methylated and butylated melamine formaldehyde resin.

9. The coating composition of claim 1 in which the blocked polyisocyanate comprises at least two isocyante groups which have been blocked by reaction with an active hydrogen bearing blocking agent, said blocked polyisocyanate crosslinking agent being included in an amount such that upon de-blocking of the isocyanate groups upon curing of the composition, about 0.5–1.6 reactive isocyanate groups per hydroxyl group of the hydroxy terminated copolymer of styrene/allyl alcohol chain extended with caprolactone and hydroxy functional polyester urethane are provided.

* * * * *

UNITED STATES PATENT AND TRADEMARK OFFICE
CERTIFICATE OF CORRECTION

PATENT NO. : 4,855,359
DATED : August 8, 1989
INVENTOR(S) : Rose A. Ryntz, Karen A. Surcina and Kenneth R. Kurple It is certified that error appears in the above—identified patent and that said Letters Patent is hereby corrected as shown below:

Column 12, line 4, "1,000-5,000" should read --1,000-15,000--
Column 12, line 68, after "functional" add the following
    --polyester urethane; and--

Signed and Sealed this

Fourteenth Day of May, 1991

Attest:

HARRY F. MANBECK, JR.

Attesting Officer

Commissioner of Patents and Trademarks